United States Patent Office 3,717,679
Patented Feb. 20, 1973

3,717,679
FLUOROCARBON CONTAINING DIALLYL AMMONIUM COMPOUND
Ralph N. Thompson and Merwin F. Hoover, Pittsburgh, Pa., assignors to Calgon Corporation, Pittsburgh, Pa.
No Drawing. Continuation-in-part of application Ser. No. 786,742, Dec. 24, 1968. This application Sept. 2, 1971, Ser. No. 177,441
Int. Cl. C07c 93/02
U.S. Cl. 260—567.6 M    3 Claims

ABSTRACT OF THE DISCLOSURE

Diallyl quaternary ammonium compounds substituted with fluorinated groups are disclosed. They may be used as water and oil repellents either in polymerized or unpolymerized form.

BACKGROUND OF THE INVENTION

This application is a continuation-in-part of application Ser. No. 786,742, filed Dec. 24, 1968.

This invention relates to compositions useful as oil and water repellents. In particular, it relates to diallyl quaternary ammonium compounds containing one or two fluorinated groups and polymers thereof.

Many types of fluorinated compositions have been proposed and are used for oil and water repellency. See, for example, U.S. Pats. 3,336,157; 3,293,306; 3,207,730. There are many others. Most such disclosures which are directed particularly to polymers containing fluorinated (or perfluoro) groups are constructed from monoethylenically unsaturated monomers such as acrylic or vinyl monomers.

The polymerization mechanism of diallyl ammonium monomers is described in an article by Butler and Angelo, J.A.C.S. 79 3128 (1957). See also U.S. Pat. 3,288,770. They may be copolymerized with certain acrylic monomers as in U.S. Pat. 2,923,701, and with sulfur dioxide as in Harada and Katayama, U.S. Pat. 3,375,233. Certain fluorinated diallyl amines have also formed polymers with sulfur dioxide as in Wright and Friedlander's U.S. Pat. 3,072,616.

SUMMARY OF THE INVENTION

We have invented a series of fluorine-containing compositions which form polymers in a manner different from the compositions of the prior art. They are quaternary ammonium compounds containing two allyl groups. The polymers of our invention give repellent finishes with increased soil release properties.

Our novel compositions are compounds of the formula $$\begin{array}{cc} CH_2 & CH_2 \\ \| & \| \\ CH & CH \\ | & | \\ CH_2 & CH_2 \\ & \diagdown \overset{\oplus}{N} \diagup \\ & \diagup \diagdown \\ X & R \\ | \\ R_f \end{array} \quad A^\ominus$$

where "$R_f$" is selected from the group consisting of straight chained fluorinated aliphatic groups of the formula —$C_nF_{2n+1}$ and —$C_nHF_{2n}$ where "$n$" is an integer from 3 to 18; "X" represents a coupling agent selected from the group consisting of —$CH_2O(CH_2)_m$ $$-CH_2OCH_2\overset{OH}{\underset{|}{C}}HCH_2-$$

—$CH_2$—$(OCH_2CH_2)_m$, where "$m$" is an integer from 1 to 4; "R" is selected from the group consisting of H, X—$R_f$, and alkyl groups having from 1 to 4 carbon atoms; "$A^\ominus$" is an anion selected from the group consisting of $Cl^\ominus$, $Br^\ominus$, and $CH_3SO_4^\ominus$.

We have found that such compounds having two allyl groups attached to the nitrogen may be polymerized into high molecular weight linear polymers in a manner similar to that disclosed by Butler in U.S. Pat. 3,288,770. The polymers are water insoluble and give good water and oil repellency to fibers. They also form high molecular weight products by copolymerization with compounds of the type used by Butler, i.e., dialkyl diallyl ammonium compounds.

The compounds of our invention may be copolymerized with other monomers which are well known and used in the art of repellency polymers. Examples of these are the diethylenically unsaturated monomers such as butadiene, isoprene, and chloroprene. Some examples of useful monoethylenically unsaturated comonomers are styrene, acrylonitrile, and the lower alkyl acrylates having alkyl ester groups of 1 to 10 carbon atoms. The resulting polymers are random, linear, water-insoluble polymers with a molecular weight of at least 1,000.

Specifically, our invention includes the following monomers which may be made by the syntheses indicated:

EXAMPLE 1

Preparation of ($C_7F_{15}CH_2OCH_2CH_2N^\oplus(CH_3)(CH_2CH=CH_2)_2)Cl^\ominus$ (1) $C_7F_{15}CH_2OH + \overline{CH_2CH_2O} \to C_7F_{15}CH_2OCH_2CH_2OH$ (2) $C_7F_{15}CH_2OCH_2CH_2OH + HBr \to$
    $C_7F_{15}CH_2OCH_2CH_2Br$ (3) $C_7F_{15}CH_2OCH_2CH_2Br + HN(CH_2CH=CH_2)_2 \to$
    $C_7F_{15}CH_2OCH_2CH_2N(CH_2CH=CH_2)_2$ (4) $(C_7F_{15}CH_2OCH_2CH_2N(CH_2CH=CH_2)_2 + CH_3Cl \to$
    $C_7F_{15}CH_2OCH_2CH_2N^\oplus(CH_3)(CH_2CH=CH_2)_2)Cl^\ominus$ (1) To a one-liter, three-neck flask fitted with a stirrer, a thermometer, a —78° condenser vented to a —183° trap, and a gas inlet tube, was added 1197 grams (2.99 moles) of $C_7F_{15}CH_2OH$. The alcohol was heated to 80° and 72.0 grams (1.63 moles) of $\overline{CH_2CH_2O}$ was added slowly. When addition was completed, the reaction mixture was distilled yielding $C_7F_{15}CH_2OCH_2CH_2OH$

B.P. 212–213°.

(2) To a one-liter, three-neck flask fitted with a stirrer, a thermometer, a —78° condenser vented through a bubble counter which was connected to a —183° trap, and a gas addition tube, was added 376 grams (0.827 mole) of $C_7F_{15}CH_2OCH_2CH_2OH$, 51 grams (0.22 mole) of $ZnBr_2$ and 15 milliliters of concentrated $H_2SO_4$. The alcohol was heated to 100–110° and 96 grams (1.18 moles) of gaseous HBr was added rapidly. The reaction product was distilled to give $C_7F_{15}CH_2OCH_2CH_2Br$, B.P. 125–128°/46 millimeters.

(3) To a one-liter, one-neck flask fitted with a stirrer and a reflux condenser was added 265 grams (0.523 mole) of $C_7F_{15}CH_2OCH_2CH_2Br$, 223 grams (2.00 moles) of $HN(CH_2CH=CH_2)_2$, 103 grams (0.743 mole) of $K_2CO_3$, and 256 grams of $H_2O$. The reaction mixture was stirred for 22 hours. The reaction mixture, when cooled, separated into two layers. The product was decanted and distilled to give $C_7F_{15}CH_2OCH_2CH_2N(CH_2CH=CH_2)_2$, B.P. 101°/0.2 millimeter. This product was then analyzed for percent C, H, and N.

Theoretical (percent): C=36.7; H=3.06; N=2.68.
Found (percent): C=36.49; H=2.96; N=3.03.

(4) To a two-liter stirred autoclave was added 614.2 grams (1.18 moles) of $$C_7F_{15}CH_2OCH_2CH_2N(CH_2CH=CH_2)_2$$

and 457 grams (9.05 moles) of $CH_3Cl$. The reaction mixture was stirred for 72 hours at 80°, then unreacted $CH_3Cl$ was vented leaving a white solid $$(C_7F_{15}CH_2OCH_2CH_2N^\oplus(CH_3)(CH_2CH=CH_2)_2)Cl^\ominus$$

The product was then analyzed for percent C, H, and N.
Theoretical (percent): C=35.5; H=3.34; N=2.44.
Found (percent): C=35.1; H=3.57; N=2.83.

EXAMPLE 2

Preparation of $$(C_7F_{15}CH_2OCH_2CH_2N^\oplus(CH_3)(CH_2CH=CH_2))Br^\ominus$$

To a five-liter flask fitted with a reflux condenser and a stirrer was added 200 grams of $H_2O$, 250 grams (2.25 moles) of $CH_3N(CH_2CH=CH_2)_2$, and 389 grams (0.746 mole) of $C_7F_{15}CH_2OCH_2CH_2Br$. The reaction mixture was stirred at reflux for eight hours. At the end of this time, the mixture was a thick, white emulsion which was washed with ethyl ether several times to remove unreacted starting materials. The final product was a water solution of $$(C_7F_{15}CH_2OCH_2CH_2N^\oplus(CH_3)(CH_2CH=CH_2))Br^\ominus$$

EXAMPLE 3

Preparation of $$(H(CF_2)_8CH_2OCH_2CH_2N^\oplus(CH_3)(CH_2CH=CH_2)_2)Cl^\ominus$$

This compound was synthesized in the manner described in Example 1.

(1)

$$H(CF_2)_8CH_2OH + \overline{CH_2CH_2O} \longrightarrow H(CF_2)_8CH_2OCH_2CH_2OH$$

B.P. 168°/56 millimeters (2) $H(CF_2)_8CH_2OCH_2CH_2OH + HBr \rightarrow$
$H(CF_2)_8CH_2OCH_2CH_2Br$ (3) $H(CF_2)_8CH_2OCH_2CH_2Br + HN(CH_2CH=CH_2)_2 \rightarrow$
$H(CF_2)_8CH_2OCH_2CH_2N(CH_2CH=CH_2)_2$ B.P. 128°/2.1 millimeters (4) $H(CF_2)_8CH_2OCH_2CH_2N(CH_2CH=CH_2)_2$
$+ CH_3Cl \rightarrow H(CF_2)_8CH_2OCH_2CH_2N^\oplus$
$(CH_3)(CH_2CH=CH_2)_2Cl^\ominus$ Theoretical (percent): C=35.7; H=3.33; N=2.31.
Found (percent): C=35.4; H=3.75; N=2.29.

EXAMPLE 4

Preparation of $$(C_3F_7CH_2O(CH_2)_4N^\oplus(CH_3)(CH_2CH=CH_2))Br^\ominus$$

(1) $C_3F_7CH_2OH + Na \rightarrow C_3F_7CH_2ONa$ (2) $C_3F_7CH_2ONa + Br(CH_2)_4Br \rightarrow C_3F_7CH_2O(CH_2)_4Br$ (3) $C_3F_7CH_2O(CH_2)_4Br + CH_3N(CH_2CH=CH_2)_2 \rightarrow$
$(C_3F_7CH_2O(CH_2)_4N^\oplus(CH_3)(CH_2CH=CH_2)_2)Br^\ominus$ (1 and 2) To a one-liter, three-neck flask fitted with a reflux condenser connected to a −183° trap and a stirrer was added 660 grams (3.3 moles) of $C_3F_7CH_2OH$. While stirring at room temperature 23 grams (1.0 mole) of sodium was slowly added. After addition of the sodium, the reaction mixture was transferred to an addition funnel attached to a two-liter, three-neck flask containing 1070 grams (4.96 moles) of $Br(CH_2)_4Br$ and fitted with a reflux condenser. The dibromide was heated to 150° and the alcohol-alcoholate mixture added over a period of thirty minutes. The mixture was then heated for fourteen hours at reflux. The mixture was cooled to room temperature and filtered. The solids were dissolved in water and the organic layer which separated was added to the filtrate, and the product distilled. Material boiling at 92–94°/28 millimeters (1052 grams) was extracted on a continuous system for seventy-two hours using Freon E-2 as the extractant. The extract was distilled to give $C_3F_7CH_2O(CH_2)_4Br$, B.P. 195–198°.

(3) To a one-liter resin kettle equipped with a reflux condenser was added 400 grams of methyl ethyl ketone, 92.7 grams (0.277 mole) of $C_3F_7CH_2O(CH_2)_4Br$ and 33.3 grams (0.301 mole) of $CH_3N(CH_2CH=CH_2)_2$. The reaction mixture was heated at reflux for eighteen hours; then most of the MEK was removed under vacuum. Repeated reprecipitation from MEK with hexane yielded a white solid $$(C_3F_7CH_2O(CH_2)_4N^\oplus(CH_3)(CH_2CH=CH_2)_2)Br^\ominus$$

This compound was analyzed for C, H, N, F, and Br.
Theoretical (percent): C=40.4; H=5.16; N=3.14; F=29.8; Br=17.9. Found (percent): C=40.1; H=5.28; N=3.94; F=30.5; Br=18.5.

EXAMPLE 5

Preparation of $$(C_3F_7CH_2OCH_2CH_2N^\oplus(CH_3)(CH_2CH=CH_2)_2)Cl^\ominus$$

The syntheses of this quaternary was run in the same manner as described in Example 1.

(1)

$$C_3F_7CH_2OH + \overline{CH_2CH_2O} \longrightarrow C_3F_7CH_2OCH_2CH_2OH$$

B.P. 159°

(2) $C_3F_7CH_2OCH_2CH_2OH + HBr \rightarrow$
$C_3F_7CH_2OCH_2CH_2Br$ (3) $C_3F_7CH_2OCH_2CH_2Br + NH(CH_2CH=CH_2)_2 \rightarrow$
$C_3F_7CH_2OCH_2CH_2N(CH_2CH=CH_2)_2$ (4) $C_3F_7CH_2OCH_2CH_2N(CH_2CH=CH_2)_2 + CH_3Cl \rightarrow$
$(C_3F_7CH_2OCH_2CH_2N^\oplus(CH_3)(CH_2CH=CH_2)_2)Cl^\ominus$

EXAMPLE 6

Preparation of $$(C_3F_7CH_2OCH_2CH_2N^\oplus(CH_3)(CH_2CH=CH_2)_2)Br^\ominus$$

To a 500 milliliter flask fitted with a reflux condenser was added 250 milliliters of methyl ethyl ketone, 43.2 grams (0.14 mole) of $C_3F_7CH_2OCH_2CH_2Br$ and 19.4 grams (0.18 mole) of $CH_3N(CH_2CH=CH_2)_2$. The reaction mixture was refluxed for forty-eight hours and then the reaction product was precipitated from solution by the addition of hexane. Reprecipitation several times yielded $$(C_3F_7CH_2OCH_2CH_2N^\oplus(CH_3)(CH_2CH=CH_2)_2)Br^\ominus$$

It is possible to prepare additional compounds of our invention by using the reaction schemes illustrated above. If one employs epichlorohydrin in the reaction scheme, the resulting X group will be $$-CH_2OCH_2\overset{OH}{\underset{|}{C}}HCH_2-$$

The monomers of our invention may be polymerized by methods which are evident to those skilled in the art. We have homopolymerized and copolymerized the monomers of our invention using solution, emulsion, and suspension techniques. Specific examples of the polymers of our invention and their repellency characteristics are set forth in the following.

EXAMPLE 7

Homopolymerization of monomer of Example 2

One hundred fifty grams of a 40% solution of the monomer (60 grams active monomer, 0.105 mole) was placed in a reaction flask fitted with stirrer, thermometer, and reflux condenser. The solution had a pH of 5.5 and no further adjustment was made. The solution was then purged with nitrogen at ambient temperature for one hour. After the nitrogen purge, the solution was heated to 80° C. A catalyst solution of ammonium persulfate (19.9 grams of $(NH_4)_2S_2O_8$/50 milliliters $H_2O$) was introduced at a rate of 0.1 milliliter/minute for 100 minutes. The polymer product separated out of solution as it was formed. After termination of the catalyst, the polymer was recovered by filtration. The polymer was dried and analyzed for fluorine. Theoretical value was 49.7% by weight fluorine. Actual value found was 47.2% by weight fluorine. A solution of the polymer in methanol was prepared and the repellency ratings determined. The results are shown below.

REPELLENCY RATING

| Percent WOF | Water | Oil |
|---|---|---|
| 10.95 | Good | 4 |
| 4.59 | do | 4 |
| 2.69 | Fair | 4 |
| 1.65 | do | 3 |

The oil and water repellency ratings were determined in the following manner.

A 3-inch by 5-inch swatch of 80 x 80 bleached cotton print cloth was padded with a polymer solution or emulsion of known strength using a laboratory padder. After padding, the cloth was cured for fifteen minutes at 170° C.

The polymer pickup of the cloth was determined by weighing the cloth before padding and then weighing it again after curing. An alternative method of determining the polymer pickup was to multiply the pickup weight of the cloth by the concentration of the padding solution. The amount of pickup was reported as percent WOF which is the percent of dry polymer solids based on weight of cloth before padding.

The samples were tested for oil repellency according to AATCC Tentative Test Method 118-1966T of the American Association of Textile Chemists and Colourists. Briefly, the test procedure is as follows:

Drops of standard test liquids, a series of hydrocarbons of varying surface tension, are placed on the fabric and observed for wetting. The oil repellency is the highest numbered test liquid which does not wet the surface. The higher the repellency rating number, the greater the resistance to oil penetration. Any repellency number greater than zero will repel most oils.

Water repellency was tested in an arbitrary manner based on a modification of the AATCC oil repellency procedure. A drop of water was placed on the surface of the fabric and the behavior observed for thirty seconds. The relative ranking scale used is presented below.

Rank: Comment

None ------- Water completely and immediately absorbed.
Poor ------- Initial repellency, but considerable adsorption before thirty seconds.
Fair ------- Some holdout, but definite evidence of partial absorption.
Good ------- Drop does not penetrate or absorb, but cannot be rolled off of the surface by tilting.
Excellent ---- Drop does not penetrate or absorb and can be readily removed from surface by tilting.

EXAMPLE 8

Copolymer of methyl methacrylate and monomer of Example 2

Twenty-five grams of a 30% solution of the monomer of Example 2 was prepared and charged into a reaction flask fitted with stirrer, thermometer, condenser, gas inlet, and addition funnel. The solution was purged for one hour with nitrogen gas at room temperature. The pH was adjusted to 4.5 and 0.3 gram of Cellosize QP-4400 (viscosity increasing protective colloid-hydroxy ethyl cellulose) was dissolved in the solution. Methyl methacrylate was pre-emulsified in water and Triton X-405. Ten percent of the pre-emulsified methyl methacrylate was added to the flask and the temperature raised to 70° C. An ammonium persulfate catalyst solution (5.42 grams of $(NH_4)_2S_2O_8$/100 milliliters of $H_2O$) was metered in at a rate of 0.1 milliliter/minute for sixty minutes. The remainder of the methyl methacrylate emulsion was simultaneously metered in over sixty minutes. The reaction mixture was then heated to 85° C. and held at that temperature for two hours. Analysis of the polymer indicated it was 95% by weight methyl methacrylate and 5% by weight monomer of Example 2. The polymer contained 2.62% fluorine. The repellency ratings were determined and are shown below.

REPELLENCY RATING

| Percent WOF | Water | Oil |
|---|---|---|
| 16.91 | None | 3 |
| 10.11 | do | 3 |
| 5.04 | do | 2 |

EXAMPLE 9

A copolymer of butyl methacrylate and the monomer of Example 2 was prepared using the polymerization technique described in Example 8. Analysis of the resulting polymer indicated that it was 90% by weight butyl methacrylate and 10% by weight monomer of Example 2. It contained 4.7% by weight fluorine. A solution of the polymer in methyl ethyl ketone was prepared and the repellency ratings determined. The results are shown below.

REPELLENCY RATING

| Percent WOF | Water | Oil |
|---|---|---|
| 8.83 | Poor | 1 |
| 4.05 | do | 0 |
| 2.39 | do | 0 |

EXAMPLE 10

A copolymer of N-hexyl methacrylate and the monomer of Example 2 was prepared using the polymerization technique described in Example 8. Analysis of the resulting polymer indicated that it was 75% by weight N-hexyl methacrylate and 25% by weight monomer of Example 2. The polymer contained 12.5% by weight fluorine. A solution of the polymer was prepared in methanol and the repellency ratings determined. The results are shown below.

REPELLENCY RATING

| Percent WOF | Water | Oil |
|---|---|---|
| 8.90 | Excellent | 2 |
| 4.25 | do | 1 |
| 2.14 | Good | 0 |

The compounds of our invention can be applied to the fabric by means other than padding. Application can be accomplished by dipping, spraying, and other methods used in the art. The compounds can be applied from dispersions, emulsions and organic solutions depending on the application techniques used. The compounds of our invention can be formulated with fluorocarbon extenders such as Phobetex.

The necessary amount of compound add-on (weight of dry compound on fiber or percent WOF) is difficult to ascertain. This amount depends on such factors as the repellency properties of the compound, application and curing techniques, physical properties of fabric or paper being treated, and the repellency properties desired in finished product. The compounds of our invention are effective over a wide range of add-ons. However, the optimum conditions are achieved with add-ons between 0.5% and 10% by weight of compound on fabric.

The polymers of our invention have a wide range of composition. The composition is determined by the desired oil and water repellency properties which are to be imparted to the fibers. In many cases, only a small weight percent of fluorinated group is necesary to achieve measurable repellency properties. However, we have found that the polymer should contain at least 5% by weight units of the fluorinated group to impart a practical oil and water repellency to most fibers. The remainder of the polymer composition consists of comonomers which are well known and used in the art of repellency finishes. Examples are the diethylenically unsaturated monomers such as butadiene, isoprene, and chloroprene. Some examples of useful monoethylenically unsaturated comonomers are styrene, acrylonitrile, and the lower alkyl acrylates and methacrylates having alkyl ester groups of 1 to 10 carbon atoms.

We do not intend to be restricted to the above specific examples and illustrations. Our invention may be otherwise practiced within the scope of the following claims.

We claim:
1. Compounds of the formula

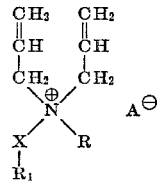

where $R_f$ is selected from the group consisting of normal straight chain fluorinated aliphatic groups of the formula —$C_nF_{2n+1}$ and —$C_nHF_{2n}$; where $n$ is an integer from 3 to 18; X is a coupling agent selected from the group consisting of —$CH_2O(CH_2)_m$,

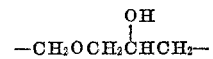

and —$CH_2$—$(OCH_2CH_2)$—$_m$, where $m$ is an integer from 1 to 4; R is an alkyl group having from 1 to 4 carbon atoms; and $A^\ominus$ is an anion selected from the group consisting of $Cl^\ominus$, $Br^\ominus$, and $CH_3SO_4^\ominus$.

2. Compound of claim 1 where $R_f$ is $C_nF_{2n+1}$ and $n$ is from 6 to 9; X is —$CH_2O(CH_2)_m$, where $m$ is an integer of 1 to 4; R is $CH_3$ and $A^\ominus$ is $Cl^\ominus$.

3. Compound of claim 1 where $R_f$ is $C_nF_{2n+1}$ and $n$ is from 6 to 9; X is —$CH_2OCH_2OCH_2CH_2$—; R is $CH_3$ and $A^\ominus$ is $Cl^\ominus$.

References Cited
UNITED STATES PATENTS 3,678,110   7/1972   Boothe et al. ____ 260—567.6 M
3,072,616   1/1963   Wright et al.

LEON ZITVER, Primary Examiner

M. W. GLYNN, Assistant Examiner

U.S. Cl. X.R.

260—79.3 MU, 86.3, 89.7 N, 459, 583 GG, 584 R, 584 B; 117—135.5.

PO-1050
(5/69)

UNITED STATES PATENT OFFICE
CERTIFICATE OF CORRECTION

Patent No. 3,717,679      Dated February 20, 1973

Inventor(s) Ralph N. Thompson and Merwin F. Hoover

It is certified that error appears in the above-identified patent and that said Letters Patent are hereby corrected as shown below:

Column 7: Line 33, $R_1$ should be $R_f$.

Column 8: Line 3, $-CNF_{2n+1}$ and $C_nHF_{2n}$; where n is an integer from should read: $-C_nF_{2n+1}$ and $C_nHF_{2n}$; where n is an integer from Line 12, from 1 to 4; R is an alkyl group having from 1 to 4 should read from 1 to 4 and R is an alkyl group having from 1 to 4

Signed and sealed this 2nd day of July 1974.

(SEAL)
Attest:

EDWARD M. FLETCHER, JR.

C. MARSHALL DANN
Commissioner of Patents